US011814979B1

(12) United States Patent
Craig et al.

(10) Patent No.: US 11,814,979 B1
(45) Date of Patent: Nov. 14, 2023

(54) SYSTEMS AND METHODS OF HYBRID BLADE TIP REPAIR

(71) Applicant: Raytheon Technologies Corporation, Farmington, CT (US)

(72) Inventors: Brian Richard Craig, Tequesta, FL (US); Brian T Hazel, Avon, CT (US); Xuan Liu, Glastonbury, CT (US); Luke Henry Rettberg, Santa Barbara, CA (US); Nicholas M LoRicco, Suffield, CT (US); Steven Ivory, Storrs Mansfield, CT (US); Michael J Minor, Mansfield, TX (US); Christopher J Bischof, Southlake, TX (US); Stewart S Fowler, Ft Worth, TX (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/949,688

(22) Filed: Sep. 21, 2022

(51) Int. Cl.
*F01D 5/28* (2006.01)
*F01D 5/00* (2006.01)
*F01D 5/14* (2006.01)

(52) U.S. Cl.
CPC ............ *F01D 5/005* (2013.01); *F01D 5/147* (2013.01); *F01D 5/28* (2013.01); *F05D 2220/32* (2013.01); *F05D 2230/80* (2013.01); *F05D 2240/30* (2013.01)

(58) Field of Classification Search
CPC . F01D 5/005; F01D 5/147; F01D 5/28; F05D 2220/32; F05D 2230/80; F05D 2240/30
See application file for complete search history.

(56) References Cited

U.S. PATENT DOCUMENTS

| | | | | |
|---|---|---|---|---|
| 5,479,704 A * | 1/1996 | Richter | ............. | B23K 15/0053 228/119 |
| 6,332,272 B1 * | 12/2001 | Sinnott | .................... | F01D 5/20 29/889.1 |
| 6,367,687 B1 * | 4/2002 | Reeves | .................. | B23K 35/38 228/206 |
| 6,837,417 B2 * | 1/2005 | Srinivasan | ........... | B23K 20/023 228/248.1 |
| 8,091,228 B2 * | 1/2012 | Hiskes | .................... | F01D 5/005 29/889.1 |
| 8,360,734 B2 * | 1/2013 | Rose | ...................... | B23K 9/167 416/228 |
| 8,544,716 B2 * | 10/2013 | Daniels | ............. | B23K 35/3033 228/119 |
| 9,074,481 B2 * | 7/2015 | Mahler | .................. | B23K 33/00 |
| 9,186,757 B2 | 11/2015 | Munshi et al. | | |
| 9,470,102 B2 * | 10/2016 | Munshi | .................. | F01D 11/14 |
| 9,511,436 B2 * | 12/2016 | Kumar | ............... | B23K 35/0244 |
| 9,700,941 B2 * | 7/2017 | James | ...................... | B22F 7/08 |

(Continued)

*Primary Examiner* — David E Sosnowski
*Assistant Examiner* — Theodore C Ribadeneyra
(74) *Attorney, Agent, or Firm* — Snell & Wilmer L.L.P.

(57) ABSTRACT

A method of repairing a tip for an airfoil is disclosed herein. In various embodiments, the method comprises: removing a portion of the airfoil that reduces a radial height of the airfoil and at least partially removes a defect of the airfoil; removing a remainder of the defect; joining, via gas tungsten arc welding, a filler material to the airfoil to repair the defect; and joining a first mating surface of the airfoil to a second mating surface of a blade tip body via a solid-state joining process.

14 Claims, 8 Drawing Sheets

(56) References Cited

U.S. PATENT DOCUMENTS

| | | | |
|---|---|---|---|
| 9,868,180 B2 | 1/2018 | Henderson et al. | |
| 10,519,777 B2* | 12/2019 | Packer | B23K 11/002 |
| 10,702,958 B2* | 7/2020 | Garay | B22D 29/00 |
| 10,717,130 B2* | 7/2020 | Garay | F01D 5/187 |
| 11,154,956 B2* | 10/2021 | Garay | B23K 35/0244 |
| 2003/0066192 A1* | 4/2003 | Wilkins | F01D 5/005 |
| | | | 29/889.1 |
| 2003/0082053 A1* | 5/2003 | Jackson | F01D 5/005 |
| | | | 29/889.1 |
| 2005/0091848 A1* | 5/2005 | Nenov | F01D 5/005 |
| | | | 416/223 R |
| 2005/0102835 A1* | 5/2005 | Trewiler | B23P 6/005 |
| | | | 29/402.09 |
| 2005/0196277 A1* | 9/2005 | Wang | F01D 5/20 |
| | | | 416/92 |
| 2007/0023485 A1* | 2/2007 | Bouet | B23K 15/0006 |
| | | | 228/119 |
| 2007/0044306 A1* | 3/2007 | Szela | B23K 9/04 |
| | | | 29/889.1 |
| 2008/0178994 A1* | 7/2008 | Qi | F01D 5/147 |
| | | | 156/245 |
| 2008/0317597 A1* | 12/2008 | Veltre | F01D 5/20 |
| | | | 416/1 |
| 2009/0028707 A1* | 1/2009 | Milleville | F01D 5/005 |
| | | | 29/888.021 |
| 2010/0050435 A1* | 3/2010 | Ahmad Zainuddin | F01D 5/005 |
| | | | 29/889.1 |
| 2010/0064515 A1* | 3/2010 | Eichmann | B23K 13/015 |
| | | | 29/889.1 |
| 2010/0074755 A1* | 3/2010 | Richter | B23K 28/02 |
| | | | 416/223 R |
| 2010/0266418 A1* | 10/2010 | Imano | C22C 19/05 |
| | | | 29/889.7 |
| 2011/0005075 A1* | 1/2011 | Trewiler | B23K 11/3081 |
| | | | 29/889.1 |
| 2011/0052386 A1* | 3/2011 | Schoonover | B23K 26/03 |
| | | | 416/223 R |
| 2012/0000890 A1* | 1/2012 | Ito | B23K 6/007 |
| | | | 219/76.1 |
| 2013/0022471 A1* | 1/2013 | Roberts, III | C04B 41/52 |
| | | | 427/140 |
| 2013/0104397 A1* | 5/2013 | Bunker | B23K 26/342 |
| | | | 29/889.1 |
| 2013/0115091 A1* | 5/2013 | Bruck | F01D 5/005 |
| | | | 416/223 R |
| 2013/0298400 A1* | 11/2013 | Munshi | F01D 11/14 |
| | | | 29/889.1 |
| 2014/0124484 A1* | 5/2014 | Burbaum | B23K 35/02 |
| | | | 29/889.1 |
| 2014/0259668 A1* | 9/2014 | Henderson | F01D 5/20 |
| | | | 29/889.1 |
| 2014/0366996 A1* | 12/2014 | Goncharov | B23K 1/0018 |
| | | | 148/528 |
| 2015/0184514 A1* | 7/2015 | Schmitt | F01D 5/186 |
| | | | 29/888.011 |
| 2015/0328717 A1* | 11/2015 | Shepler | B22F 10/66 |
| | | | 219/121.6 |
| 2016/0045982 A1 | 2/2016 | Stoodt et al. | |
| 2016/0069184 A1* | 3/2016 | Ribic | B23K 26/0626 |
| | | | 219/76.12 |
| 2016/0076376 A1* | 3/2016 | Trickey | F01D 5/005 |
| | | | 228/114 |
| 2017/0247808 A1* | 8/2017 | Nagaraj | F01D 5/288 |
| 2017/0328225 A1* | 11/2017 | Mottin | B23K 26/342 |
| 2018/0216464 A1* | 8/2018 | Bezanson | F01D 5/34 |
| 2018/0216465 A1 | 8/2018 | Seidel et al. | |
| 2018/0298765 A1* | 10/2018 | Beyer | F01D 5/147 |
| 2018/0304418 A1* | 10/2018 | Wiebe | F01D 5/282 |

* cited by examiner

SECT A-A

SECT B-B

SYSTEMS AND METHODS OF HYBRID BLADE TIP REPAIR

FIELD

The present disclosure relates generally to blade tip repair systems and methods, and more particularly to, systems and methods for hybrid repair processes for a tip of an airfoil.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of airfoils. The rotor may be an integrally bladed rotor ("IBR") or a mechanically bladed rotor.

The rotor disk and airfoils in the IBR are one piece (i.e., monolithic, or nearly monolithic) with the airfoils spaced around the circumference of the rotor disk. Conventional IBRs may be formed using a variety of technical methods including integral casting, machining from a solid billet, or by welding or bonding the airfoils to the rotor disk.

High pressure turbine blade tips experience distress during service. This distress manifest itself in the form of tip rubs, oxidation, erosion, and thermal mechanical fatigue (TMF), impact damage and mechanical rub with the shroud. Often these failure modes are combined and can accelerate distress. Eventually the distress becomes severe enough where the tip condition may drive an engine off wing for repair/overhaul. At overhaul, engine run turbine blades are repaired and restored whenever possible. Repaired turbine blades are much more economical than buying new replacement parts. However, today's turbine blade tip repair techniques do not have the durability of newly manufactured parts and show decreased life the more repairs they have had. Most blade tips are limited to 1-3 repairs depending on their operational environment.

SUMMARY

A method of repairing a tip for an airfoil is disclosed herein. In various embodiments, the method comprises: removing a portion of the airfoil that reduces a radial height of the airfoil and at least partially removes a defect of the airfoil; removing a remainder of the defect; joining, via gas tungsten arc welding, a filler material to the airfoil to repair the defect; removing excess weld material of a first mating surface to generate a flatness of the first mating surface that is less than a flatness threshold; and joining the first mating surface of the airfoil to a second mating surface of a blade tip body via a solid-state joining process.

In various embodiments, the first mating surface and the second mating surface are substantially complimentary in shape.

In various embodiments, the method further comprises forming the blade tip body prior to joining the first mating surface and the second mating surface. In various embodiments, forming the blade tip body comprises casting the blade tip body. The airfoil can comprise a first material, the blade tip body comprises a second material, and the second material is different from the first material. The first material and the second material can be both single crystal metal alloys.

In various embodiments, wherein the joining the filler material to the airfoil further comprising forming a surface via the gas tungsten arc welding. The method can further comprise grinding the surface to form the first mating surface.

In various embodiments, the first mating surface and the second mating surface each comprise a flatness between 0.0001 inches and 0.01 inches.

In various embodiments, a surface roughness of the first mating surface and the second mating surface are each less than 16 micro inches.

A method of repairing a blade tip is disclosed herein. In various embodiments, the method comprises: removing a portion of an airfoil; repairing, via gas tungsten arc welding, a defect of the airfoil; forming a first mating surface of the airfoil, the first mating surface disposed radially outward from a cooling passages network within the airfoil; and joining the first mating surface of the airfoil to a second mating surface of a blade tip body via a solid-state joining process.

In various embodiments, the airfoil comprises a first metal alloy and the blade tip body comprises a second metal alloy, and wherein the first metal alloy and the second metal alloy are different materials.

In various embodiments, a filler material from the gas tungsten arc welding is a different material from the first metal alloy and the second metal alloy.

In various embodiments, the first mating surface and the second mating surface are substantially complimentary in shape.

In various embodiments, the method further comprises forming the blade tip body by casting a preform of the blade tip body.

In various embodiments, the first mating surface and the second mating surface each comprise a flatness between 0.0001 inches and 0.01 inches.

A bladed rotor is disclosed herein. In various embodiments, the bladed rotor comprises: a hub; a rotor disk extending radially outward from the hub and defining a platform; and a repaired airfoil extending radially outward from the repaired airfoil, the repaired airfoil comprising a main airfoil body made from a first metal alloy, a blade tip body made from a second metal alloy, the second metal alloy being different from the first metal alloy, and a repair portion including a filler material from a gas tungsten arc welding process.

In various embodiments, the repaired airfoil comprises a joint region disposed between the main airfoil body and the blade tip body, the joint region disposed radially outward from a cooling passages network in the main airfoil body.

In various embodiments, the bladed rotor comprises a plurality of airfoils that are different from the repaired airfoil.

In various embodiments, the blade tip body and the main airfoil body each comprise a single crystal alloy.

In various embodiments, the rotor disk and the main airfoil body are integrally formed.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Disclosed herein is a blade tip that is built up via a hybrid (i.e., multiple) processes in conjunction with each other. Some of the processes can include are laser cladding, gas tungsten arc welding ("GTAW"), field assisted sintering technology ("FAST") or other solid state joining processes, and/or nano-foil bonding. In various embodiments, using GTAW to repair an open core condition. Then, a tip cap could be machined flat to provide a faying surface which a piece of single crystal (SX) could then be bonded to using FAST or nano-foil bonding to complete the build-up of the blade tip.

In various embodiments, the second blade tip is a single crystal preform. In various embodiments, the defect, or defects can be due to distress or oxidization. The single crystal material could be the same composition as the base material or a material with enhanced durability which is desirable at the tip due to environment and high local metal temperatures. The present disclosure is not limited in this regard. In various embodiments, the systems and methods for blade tip repair disclosed herein can result in longer lasting, more durable blade tip repairs, longer time on wing for engines utilizing repaired blades.

Figure 1A:
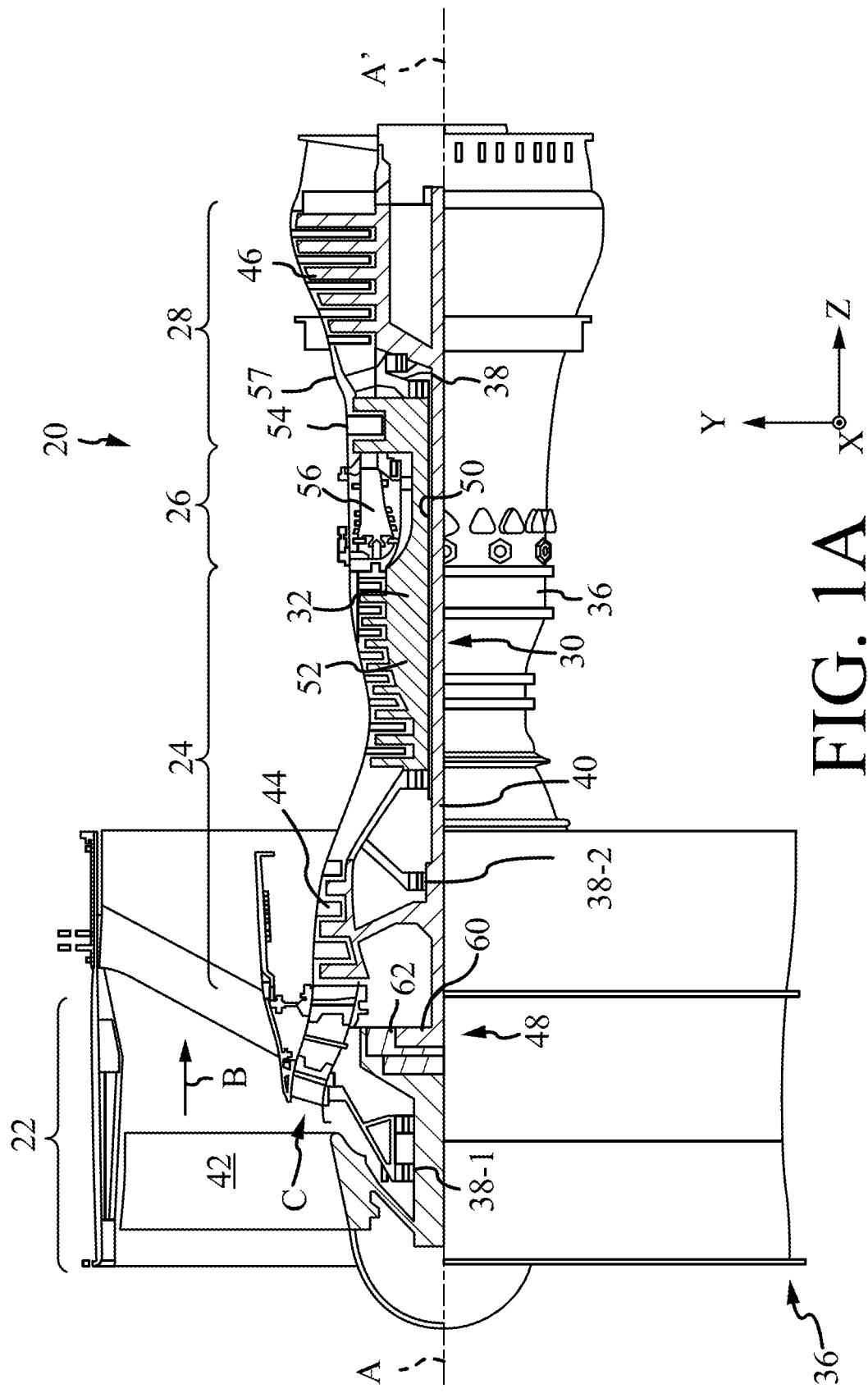
FIG. 1A illustrates a cross-sectional view of a gas-turbine engine, in accordance with various embodiments.

With reference to FIG. 1A, a gas turbine engine 20 is shown according to various embodiments. Gas turbine engine 20 may be a two-spool turbofan that generally incorporates a fan section 22, a compressor section 24, a combustor section 26, and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low-speed spool 30 and a high-speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples' inner shaft 40 to a rotating fan structure. High speed spool 32 may comprise an outer shaft 50 that interconnects a high-pressure compressor 52 and high-pressure turbine 54. A combustor 56 may be located between high pressure compressor 52 and high-pressure turbine 54. A mid-turbine frame 57 of engine static structure 36 may be located generally between high pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high-pressure compressor 52, mixed and burned with fuel in combustor 56, then expanded over high-pressure turbine 54 and low-pressure turbine 46. Turbines 46, 54 rotationally drive the respective low speed spool 30 and high-speed spool 32 in response to the expansion.

Figure 1B:
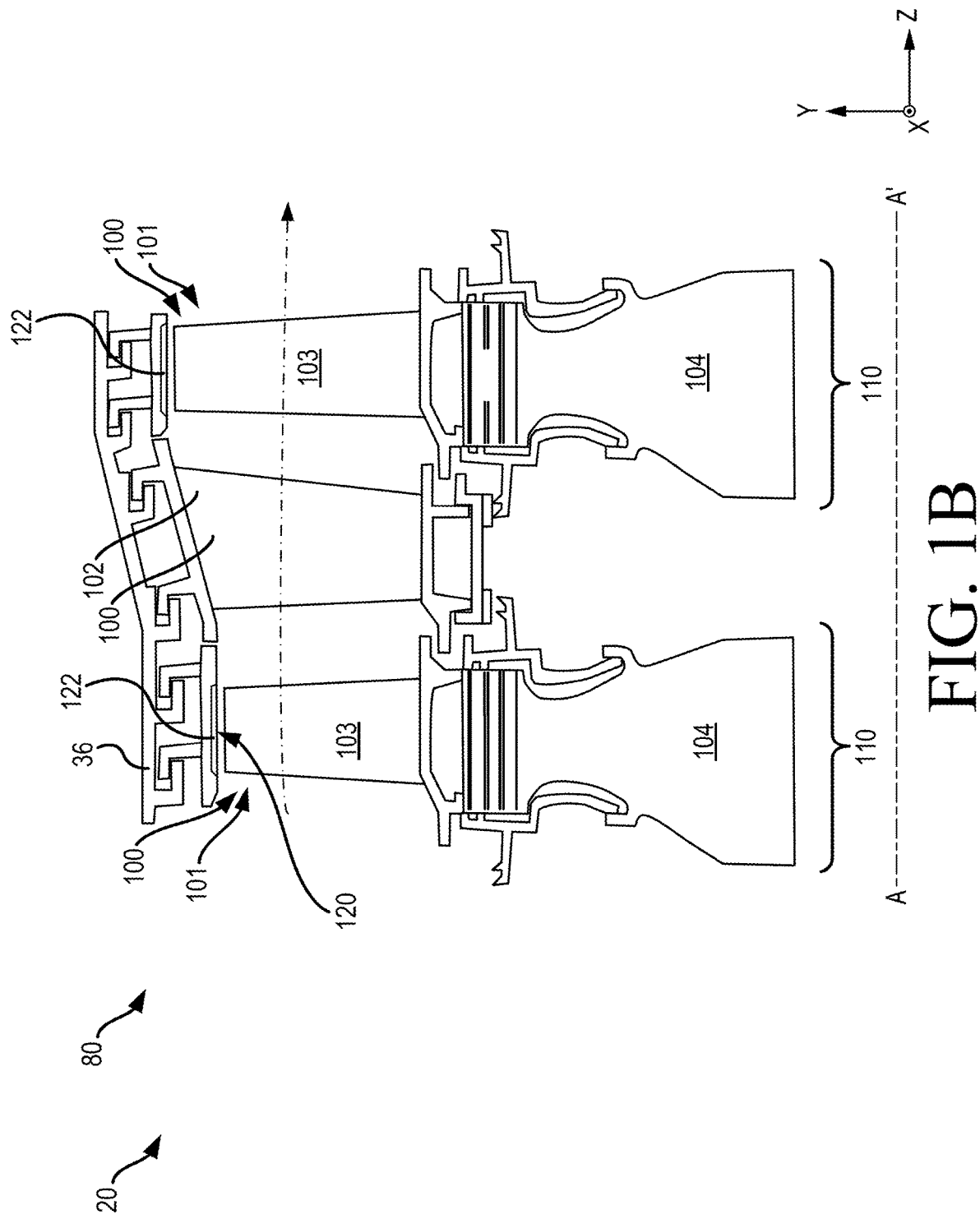
FIG. 1B illustrates a cross-sectional view of a section of a gas turbine engine, in accordance with various embodiments.

Referring now to FIG. 1B and still to FIG. 1A, according to various embodiments, each of low pressure compressor 44, high pressure compressor 52, low pressure turbine 46, and high pressure turbine 54 in gas turbine engine 20 may comprise one or more stages or sets of rotating blades 101 and one or more stages or sets of stationary vanes 102 axially interspersed with the associated blade stages but non-rotating about engine central longitudinal axis A-A'. The compressor and turbine sections 24, 28 may include rotor assemblies 110. Each compressor stage and turbine stage may comprise multiple interspersed stages of blades 101 and vanes 102. Within the rotor assemblies 110 of gas turbine engine 20 are multiple rotor disks, which may include one or more cover plates or minidisks. The blades 101 rotate about engine central longitudinal axis A-A', while the vanes 102 remain stationary with respect to engine central longitudinal axis A-A'. For example, FIG. 1B schematically shows, by example, a portion of an engine section 80, which is illustrated as a turbine section 28 of gas turbine engine 20. It will be understood that the repair and/or manufacturing systems and methods in the present disclosure are not limited to the turbine section 28 and could extend to other sections of the gas turbine engine 20, including but not limited to compressor section 24.

Engine section 80 may include alternating rows of blades 101 and vanes 102 comprising airfoils 100 that extend into the core flow path C. The blades 101 may each include a bladed rotor 100. In various embodiments, the bladed rotor 100 can comprise a mechanically bladed rotor (i.e., each airfoil 103 mechanically coupled to the rotor disk 104). However, the present disclosure is not limited in this regard. For example, the bladed rotor 100 is an integrally bladed rotor, such that the airfoils 103 (e.g., blades) and rotor disks 104 are formed from a single integral component (i.e., a monolithic component formed of a single piece), in accordance with various embodiments.

The airfoils 103 extend radially outward from the rotor disk 104. An outer engine case 120 is disposed radially outward from a tip of each airfoil 103. The outer engine case 120 comprises an abradable material 122 disposed radially adjacent to the tip of each airfoil 103. In this regard, the tip of each airfoil 103 comprises a coating, as described further herein, that includes an abrasive material. The abrasive material is configured to interface with the abradable material 122 of the outer engine case during operation of the gas turbine engine 20. Initially, the abrasive material of the coating cuts into the abradable material, forming a trench, a recess, or the like. The coating is configured protect the tips of airfoils 103 for the bladed rotor 100 from burning up during operation of the gas turbine engine 20.

Figure 2:
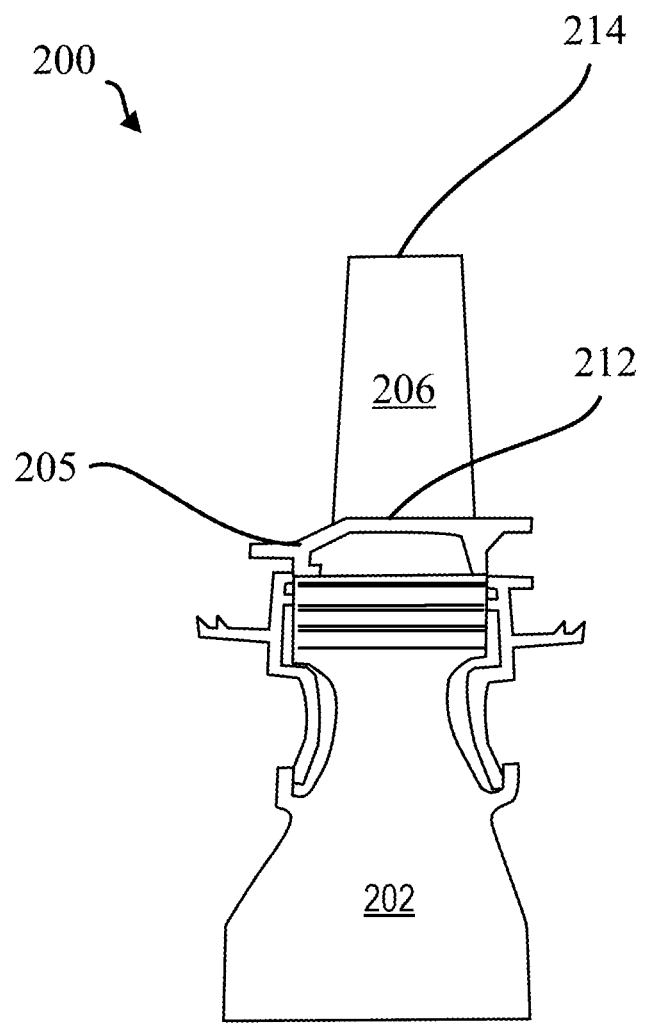
FIG. 2 illustrates a perspective view of a bladed rotor, in accordance with various embodiments.

Referring now to FIG. 2, a perspective view of a bladed rotor 200 is illustrated in accordance with various embodiments. The bladed rotor 200 can be in accordance with any of the bladed rotor 100 from FIG. 1A. The present disclosure is not limited in this regard. The bladed rotor 200 comprises a hub 202, a platform 205, and a plurality of an airfoils 206. Each airfoil 206 of the bladed rotor 200 extends radially outward from a respective platform 205. For example, the airfoil 206 extends radially outward from a root 212 of the airfoil 206 to a tip 214 of the airfoil 206. The root 212 can be integral with the platform 205 or coupled to the platform 205 as described previously herein. The present disclosure is not limited in this regard.

Figure 3:
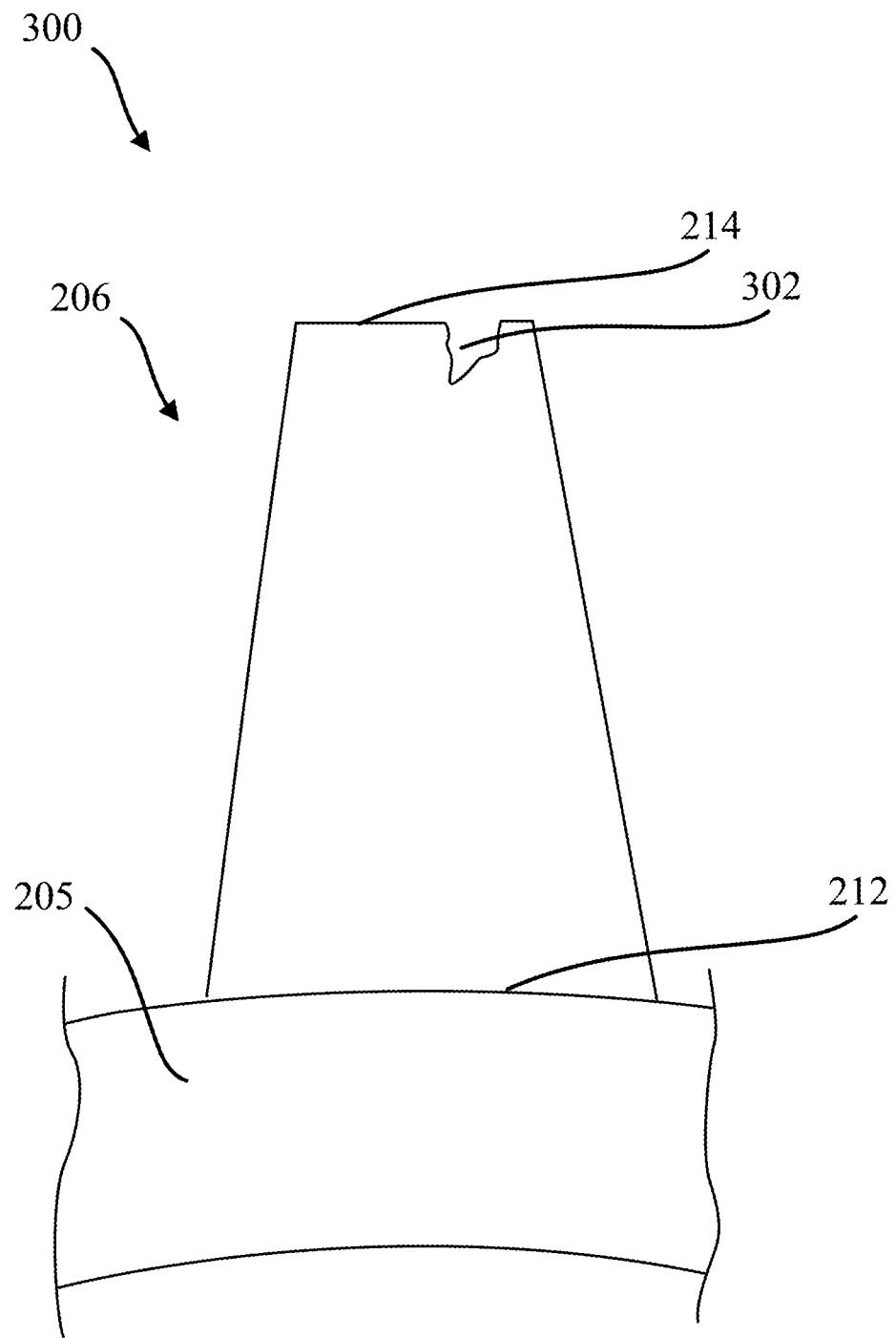
FIG. 3 illustrates a side view of a blade of a bladed rotor after use, in accordance with various embodiments.
Figure 4:
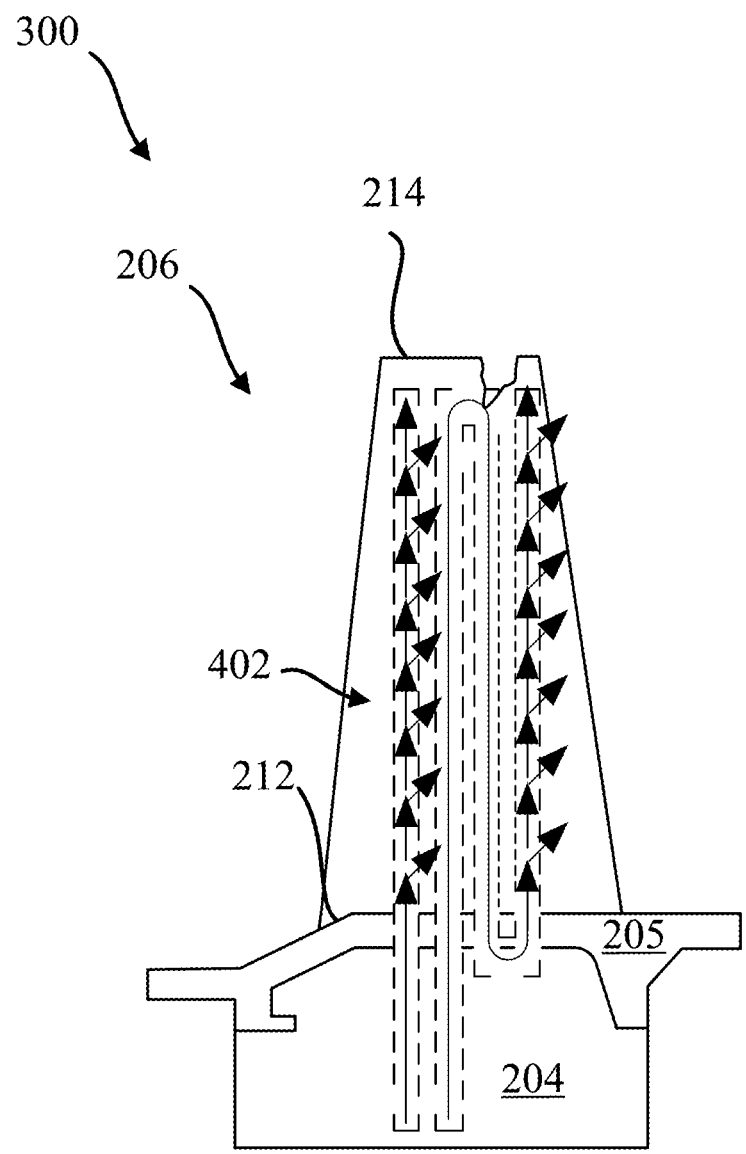
FIG. 4 illustrates a side view of a blade of a bladed rotor after, in accordance with various embodiments.

Referring now to FIG. 3, a side view of a portion of a bladed rotor 300 after use, and prior to repair, is illustrated with like numerals depicting like elements, in accordance with various embodiments. In various embodiments, the bladed rotor 300 is at overhaul (or another maintenance interval). In this regard, the bladed rotor 300 comprises an airfoil 206 with a defect 302 proximate the tip 214 of the airfoil 206. In various embodiments, the defect 302 can extend radially inward along the airfoil 206 to a location past a cooling passage network 402 as shown in FIG. 4.

In this regard, to repair the tip 214 of the airfoil 206, an open core condition (i.e., the cooling passages of the cooling passage network 402) can become at least partially exposed. In this regard, a hybrid approach to blade tip repair can generate a robust tip with extended life relative to typical blade tip repairs as described further herein.

Figure 5:
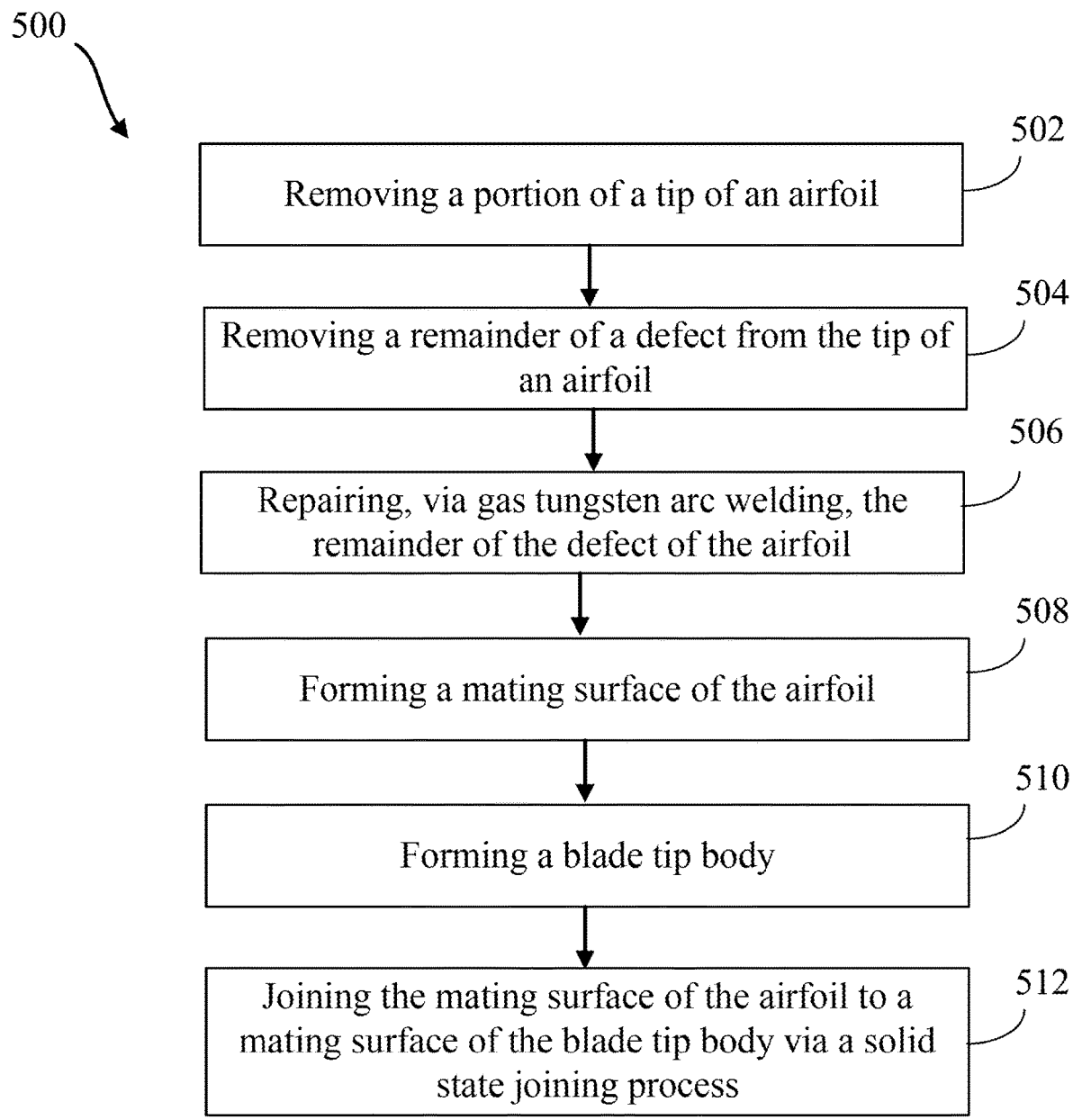
FIG. 5 illustrates a flow chart for a repair process of a blade tip for a bladed rotor, in accordance with various embodiments.
Figure 6:
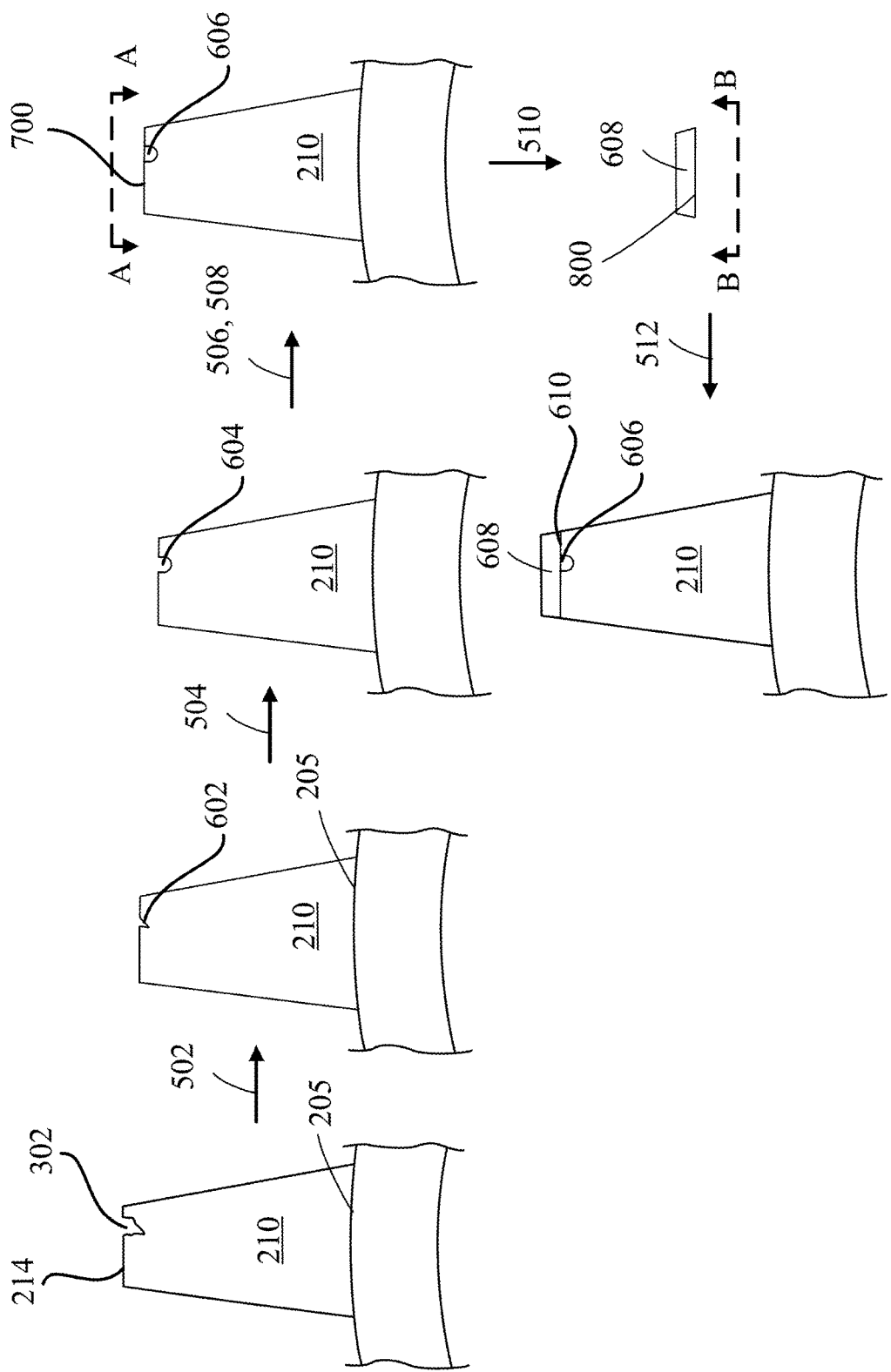
FIG. 6 illustrates a repair process of a blade tip for a bladed rotor, in accordance with various embodiments.

Referring now to FIGS. 5 and 6, a flow chart for a repair process 500 (FIG. 5), and illustrations of the repair process 500 (FIG. 6) for repairing a tip 214 of an airfoil 206 for a bladed rotor 200 is illustrated, in accordance with various embodiments. In various embodiments, the repair process 500 comprises removing a portion of a tip of an airfoil 206 (step 502). In various embodiments, the airfoil 206 comprises a defect 302 disposed in a tip 214 of the airfoil 206. In various embodiments, in response to removing the portion of the airfoil in step 502, a span (i.e., a radial length measured from the platform 205) of the airfoil 206 is reduced. In various embodiments, prior to, or instead of, performing step 502, the repair process 500 can comprise routing a defect (i.e., a crack or the like), followed by a grind operation that forms the mating surface.

In various embodiments, removing the portion of the tip of the airfoil 206 can comprise grinding the portion of the airfoil off the airfoil 206. In various embodiments, after step 502, remainder portion 602 of the defect 302 of the airfoil 206 can remain. In various embodiments, the remainder portion 602 can expose the cooling passage network 402 (e.g., a cooling passage in the cooling passage network 402) to an external environment. In this regard, the cooling passage network 402 from FIG. 4 can be exposed to the external environment during the repair process 500, in accordance with various embodiments.

In various embodiments, the repair process 500 further comprises removing the remainder portion 602 of the defect 302 (step 504). In various embodiments, step 504 can create a smooth aperture (e.g., via a curved portion or the like) formed in a sidewall of the airfoil 206. In various embodiments, the smooth aperture can ensure that the repaired blade tip does not have any stress concentrations after the repair. For example, a notch stress can occur in sharp points or the like, even after a repair process is performed.

In various embodiments, the repair process 500 further comprises repairing, via gas tungsten arc welding, the smooth aperture 604 generated from step 504 (step 506). In various embodiments, gas tungsten arc welding is a manual weld process where a filler material is deposited in the area being repaired (e.g., the smooth aperture 604) while a welding torch maintains a short arc length joining the filler material 606 to the airfoil 206. To strike the welding arc, a high-frequency generator provides an electric spark. This spark is a conductive path for the welding current through the shielding gas and allows the arc to be initiated while eth electrode and the airfoil 206 are separated, typically about 1.5-3 mm (0.06-0.12 inches) apart.

Figure 7:
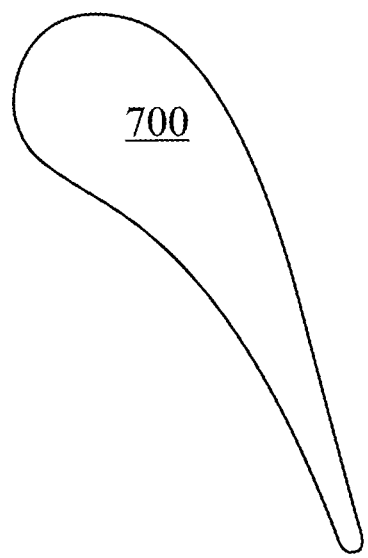
FIG. 7 illustrates a mating surface of an airfoil during a repair process, in accordance with various embodiments.

In various embodiments, after step 506, the cooling passage of the cooling passage network may no longer be exposed in accordance with various embodiments. In various embodiments, if any of the cooling passage network 402 from FIG. 4 remains exposed, a mating surface can be formed on a radially outer end of the airfoil 206. For example, any remaining openings to the cooling passage network 402 from FIG. 4 can be filled in accordance with steps 504 and 506 as described previously herein to generate a mating surface 700 as shown in FIG. 7.

In various embodiments, the mating surface 700 can be relatively flat and relatively smooth. For example, a surface roughness of the mating surface can be less than or equal to 16 microinches, or less than or equal to 8 microinches. In various embodiments, a flatness of the mating surface 700 can be between 0.0001 inches (0.0025 cm) and 0.01 (0.25 cm), or between 0.0001 inches (0.0025 cm) and 0.005 inches (0.013 cm). As the welding operation may leave behind excess metal on the mating surface 700 that exceeds these flatness values, a grind operation may be performed to form a suitable mating surface. However, the present disclosure is not limited in this regard. In various embodiments, by having a relatively flat mating surface and a relatively smooth mating surface, a more robust joint can be generated from the solid-state joining process (e.g., a FAST process or the like).

In various embodiments, the repair process 500 further comprises forming a blade tip body 608 (step 510). In various embodiments, the blade tip body 608 is a different material relative to the airfoil 206. For example, the airfoil 206 comprises a first material and the blade tip body 608 comprises a second material. The structurally limiting features of the remainder of the airfoil 206 can comprise stress from high cycle fatigue, stress from low cycle fatigue, damage tolerance, or the like. This structurally limiting feature can be different compared to the structurally limiting feature of the blade tip body 608, which can comprise oxidation, erosion, TMF, or the like. Due to being exposed to different structural limitations, it can be desirable to manufacture the blade tip body 608 used in the repair from a different material, as long as a strong bond is able to be created in a joining step. In this regard, the repair process 500 disclosed herein facilitates the use of a different material for the blade tip body 608 due to the strong joint generated from a solid-state bonding step (e.g., step 512 as described further herein.

In various embodiments, the material for the airfoil 206 can comprise a greater Von Mises yield stress relative to the blade tip body 608. In various embodiments, thermal fatigue is a dramatically severe form of fatigue. Whereas normal high-cycle fatigue occurs at stresses comfortably in the elastic range (i.e., usually well below the yield point) thermal fatigue is driven by thermal strains that force deformation well into the plastic flow regime. The maximum stresses, consequently, are therefore well above the yield point. In this regard, thermomechanical fatigue, which is far more likely to occur at a tip 214 of an airfoil 206, can be limited by tensile strain at low temperature changing to compressive (or lower tensile) strain at high temperatures. Thus, a material that has a lower Von Mises yield stress relative to the material of the blade tip body 608 can potentially handle thermal fatigue better, resulting in a more durable airfoil 206 relative to typical blades after repair process 500 is performed.

In various embodiments, the airfoil 206 can comprise a first alloy (e.g., a superalloy, such as a cobalt or a nickel-based alloy), and the blade tip body 608 can comprise a second alloy that is different from the first alloy (e.g., a superalloy, such as a cobalt or a nickel-based alloy). In various embodiments, the first alloy and the second alloy can both comprise a single crystal alloy; however, the present disclosure is not limited in this regard. In various embodiments, a single crystal alloy can be more robust relative to polycrystal alloys. In various embodiments, the first alloy can comprise between 56% and 62% nickel, between 4% and 12% chromium, between 1.5% and 6% molybdenum, between 5 and 15% cobalt, between 3 and 7% tungsten, between 4 and 12% tantalum, and between 3% and 7% aluminum (e.g., an alloy in accordance with PWA 1426, PWA 1429, PWA 1432, PWA 1437, PWA 1440, PWA 1449, PWA 1455, PWA 1475, PWA 1480, PWA 1483, PWA 1484, PWA 1487, PWA 663, PWA 1497, PWA 1499, or the like). In various embodiments, the second alloy can comprise between 54% and 72% nickel, between 4% and 20% chromium, between 0.0% and 10% molybdenum, between 7% and 19% cobalt, between 0% and 6% niobium, between 0% and 10% tungsten, between 0% and 10% titanium, between 0% and 8% tantalum, between 0% and 6% rhenium, between 0% and 7% aluminum, and between 0% and 2% hafnium (e.g., Rene 100, Rene 104, Rene 108, Rene 120, Rene 125, Rene 142, Rene 220, Rene 41, Rene 77, Rene 80, Rene 88, Rene 95, Rene N4, Rene N5, Rene N500, Rene 195, or the like). In various embodiments, the first alloy comprises PWA 1429 and the second alloy comprises Rene 195. However, the present disclosure is not limited in this regard. In various embodiments, the tip body can be a second alloy that has better rub characteristics, improving sealing capability with the outer air seal rather than improving durability. In various embodiments, the airfoil 206 can be cast from the first alloy and the blade tip body 608 is cast from the second alloy.

In various embodiments, step 504 further comprises casting the blade tip body 608. However, the present disclosure is not limited in this regard. For example, the blade tip body 608 can be additively manufactured, machined from a stock material, or the like and still be within the scope of this disclosure.

Figure 8:
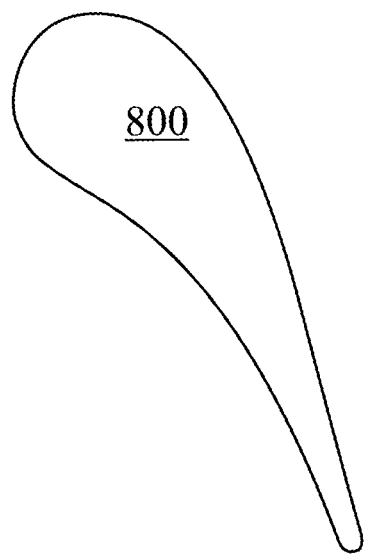
FIG. 8 illustrates a mating surface of a blade tip preform during a repair process, in accordance with various embodiments.

In various embodiments, the blade tip body 608 defines a mating surface (e.g., mating surface 800 from FIG. 8) in response to the airfoil 206 having the mating surface 700 of FIG. 7. In this regard, the mating surface 800 of the blade tip body 608 can be substantially complimentary to the mating surface 700 of the airfoil 206 after step 508 of the process 500. "Substantially complimentary" as described herein refers to being within a 0.1 inch profile (0.25 cm profile) of the other mating surface or being within a 0.05 inch profile (0.127 cm) of the other mating surface.

In various embodiments, the repair process 500 further comprises aligning the mating surface 700 of the airfoil 206 with the mating surface 800 of the blade tip body 608 and joining the airfoil 206 to the blade tip body 608 via a solid stage joining process (step 512). In various embodiments, the solid-state joining process can comprise the FAST process, a diffusion bonding process, friction welding, or the like. The present disclosure is not limited in this regard.

In various embodiments, the blade tip body 608 can comprise a material configured to withstand limiting structural characteristics typical of a blade tip to extend a life of a repaired bladed rotor, in accordance with various embodiments. In this regard, step 510 can comprise casting the blade tip body 608 from a super alloy that is different from a material of the airfoil 206. For example, the blade tip body 608 can comprise Rene 195, whereas the airfoil 206 can comprise PWA 1429, in accordance with various embodiments. However, the present disclosure is not limited in this regard, and any alloy being coupled to an airfoil during a repair process as described herein is within the scope of this disclosure.

In various embodiments, step 512 further comprises coupling the blade tip body 608 to the airfoil 206 after step 510 via the FAST process. For example, in various embodiments, the joining process may produce acceptable material properties in and around a joint region (e.g., region 610) or threshold location of the first segment. In various embodiments, the processing order depends upon which path produces the desired combination of properties at, for example, both a joint and in the material of the airfoil 206 and the material of the blade tip body 608. In various embodiments, a threshold location of the first segment may be determined to be, for example, a location with high structural margins and low stress. Such a location may be determined by performing a series of stress tests of the first segment to determine the location where the first segment may be coupled to the second segment. In various embodiments, the FAST process may be used to join the airfoil 206 after step 510 to the blade tip body 608. In various embodiments of the airfoil 206, the heat treatment of the airfoil 206 occurs after a joining process. In various embodiments of the airfoil 206, the heat treatment includes at least one of a solution heat treatment, a precipitation heat treatment, or stress relief. However, the present disclosure is not limited in this regard.

In various embodiments, the FAST process is a low voltage, direct current (DC) pulsed current activated, pressure-assisted sintering, and synthesis technique. The FAST process can be used to synthesize adjacent components (e.g., the airfoil 206 being repaired and the blade tip body 608 from FIG. 6) and/or to densify materials in one step. Since the airfoil 206 and blade tip body 608 are electrically conductive, energy can be dissipated directly within the airfoil 206 and/or the blade tip body 608 and the electrically conductive parts of the pressing tool.

The FAST process comprises a mechanical loading system, which acts at the same time as high-power electrical circuit, placed in a controlled atmosphere. The electrical conductivity of the materials used for tooling facilitate low voltages (typically below 10 V applied to the whole set-up) and produce high currents (typically from 1 to 10 kA) leading to efficient heating. Even in the case of electrically non-conductive sintering powder, heat is quickly and efficiently transferred to the airfoil 206 and/or the blade tip body 608 described previously herein. Depending on the used hardware it is possible to define pulse and pause durations or more specialized pulse patterns. Typical pulse duration is in the order of a few milliseconds. Owing to the compact geometry of the die and punches, sintering cycles with heating rates as high as 1000° C. per minute are thus possible and enable to significantly reduce the total duration of the process and energy costs. Standard cooling rates up to 150° C. per minute are possible; additional active cooling under gas flow enable quenching rates of 400° C. per minute. At the same time, the simultaneous application of a uniaxial mechanical pressure enhances densification (maximal loads typically between 50 and 250 kN). The process can take place under vacuum or protective gas at atmospheric pressure: all heated parts are kept in a water-cooled chamber. Control of the processing cycle is usually done by temperature measurement (using either thermocouples or axial/radial pyrometers, etc.) but can also be achieved by other methods like power, current, or simply by displacement control. Maximal temperature achieved by using standard graphite tools lies up to 2400° C.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of repairing a tip for an airfoil, the method comprising:
   removing a portion of the airfoil that reduces a radial height of the airfoil and at least partially removes a defect of the airfoil;
   removing a remainder of the defect;
   joining, via gas tungsten arc welding, a filler material to the airfoil to repair the defect;
   removing excess weld material of a first mating surface to generate a flatness for the first mating surface that is less than a flatness threshold; and
   joining the first mating surface of the airfoil to a second mating surface of a blade tip body via a solid-state joining process, wherein a surface roughness of the first mating surface and the second mating surface are each less than 16 micro inches.

2. The method of claim 1, wherein the first mating surface and the second mating surface are substantially complimentary in shape.

3. The method of claim 1, further comprising forming the blade tip body prior to joining the first mating surface and the second mating surface.

4. The method of claim 3, wherein forming the blade tip body comprises casting the blade tip body.

5. The method of claim 3, wherein:
   the airfoil comprises a first material,
   the blade tip body comprises a second material, and
   the second material is different from the first material.

6. The method of claim 5, wherein the first material and the second material are both single crystal metal alloys.

7. The method of claim 1, wherein the joining the filler material to the airfoil further comprising forming a surface via the gas tungsten arc welding.

8. The method of claim 7, further comprising grinding the surface to form the first mating surface.

9. A method of repairing a blade tip, the method comprising:
   removing a portion of an airfoil;
   repairing, via gas tungsten arc welding, a defect of the airfoil;
   forming a first mating surface of the airfoil, the first mating surface disposed radially outward from a cooling passages network within the airfoil; and
   joining the first mating surface of the airfoil to a second mating surface of a blade tip body via a solid-state joining process, wherein a surface roughness of the first mating surface and the second mating surface are each less than 16 micro inches.

10. The method of claim 9, wherein the airfoil comprises a first metal alloy and the blade tip body comprises a second metal alloy, and wherein the first metal alloy and the second metal alloy are different materials.

11. The method of claim 10, wherein a filler material from the gas tungsten arc welding is a different material from the first metal alloy and the second metal alloy.

12. The method of manufacture of claim 9, wherein the first mating surface and the second mating surface are substantially complimentary in shape.

13. The method of manufacture of claim 9, further comprising forming the blade tip body by casting a preform of the blade tip body.

14. The method of manufacture of claim 9, wherein the first mating surface and the second mating surface each comprise a flatness between 0.0001 inches and 0.01 inches.

* * * * *